United States Patent [19]

Buxton

[11] 4,349,771

[45] Sep. 14, 1982

[54] STEPPER MOTOR CONTROL CIRCUIT

[75] Inventor: Keith Buxton, Mansfield, England

[73] Assignee: Lucas Industries Limited, Birmingham, England

[21] Appl. No.: 188,212

[22] Filed: Sep. 17, 1980

[30] Foreign Application Priority Data

Sep. 26, 1979 [GB] United Kingdom ............... 7933441

[51] Int. Cl.³ .......................................... G05B 19/40
[52] U.S. Cl. .................................. 318/685; 318/396; 318/415
[58] Field of Search ............... 318/685, 696, 415, 396

[56] References Cited

U.S. PATENT DOCUMENTS 3,619,757 11/1971 Ioerger ............................... 318/685
3,932,796 1/1976 Kreithen ............................ 318/685

Primary Examiner—J. V. Truhe
Assistant Examiner—Eugene S. Indyk
Attorney, Agent, or Firm—Trexler, Bushnell & Wolters, Ltd.

[57] ABSTRACT

A stepper motor control includes an integrator, a first error amplifier comparing the integrator output with a feedback signal from a shaft position transducer, a second error amplifier comparing the transducer output with a demand signal, a low wins selector which passes to the integrator the output of whichever one of the first and second error amplifier is producing the lowest absolute value output, integrator reset means sensitive to the output of the first error amplifier and acting to limit the slew rate of the integrator output, a pulse generator driven by the selector and a motor drive circuit pulsing the motor coils.

1 Claim, 3 Drawing Figures

STEPPER MOTOR CONTROL CIRCUIT

This invention relates to a stepper motor control circuit.

In control systems there are many advantages inherent in the use of stepper motors, the principle being that a load, e.g. a control valve, can be driven to a precise position and held in the position.

However, stepper motors have serious limitations in that the speed at which a given load can be driven is limited and if it is attempted to drive such a load too fast slippage will occur, i.e. the motor will stall. It has also been found that stalling can occur during acceleration of the motor.

It is an object of the invention to provide a stepper motor control circuit by means of which acceleration, steady running, and deceleration of the motor are all controlled to ensure that stalling is avoided.

A stepper motor control circuit in accordance with the invention comprises an electrical integrator generating an output signal dependent on the time interval of its input signal, a first error signal generating means connected to said integrator output and to the output of a transducer means sensitive to the value of a parameter variable by movement of the stepper motor shaft and producing a first error signal dependent on the difference between the integrator and transducer means outputs, a second error signal generating means for comparing the actual value of said parameter (as represented by the transducer means output) with a desired value thereof and producing a second error signal dependent on the difference between the desired and actual values of said parameters, selector means connected to said first and second error signal generating means and to said integrator and selecting the one of said first and second error signals having the lesser absolute value for application to the integrator input, integrator reset means connected to the output of the first error signal generating means and to the input of the integrator and applying to the integrator an additional signal varying non-linearly with the output of the first error signal generating means whereby the rate of change of the output of the integrator is limited in accordance with the value of the first error signal, pulse generator means connected to the output of said selector means and producing an output of frequency determined by the output of said selector means and a stepper motor drive circuit connected to the pulse generator means and providing driving pulses to the stepper motor.

An example of the invention is shown in the accompanying drawings in which.

Figure 1:
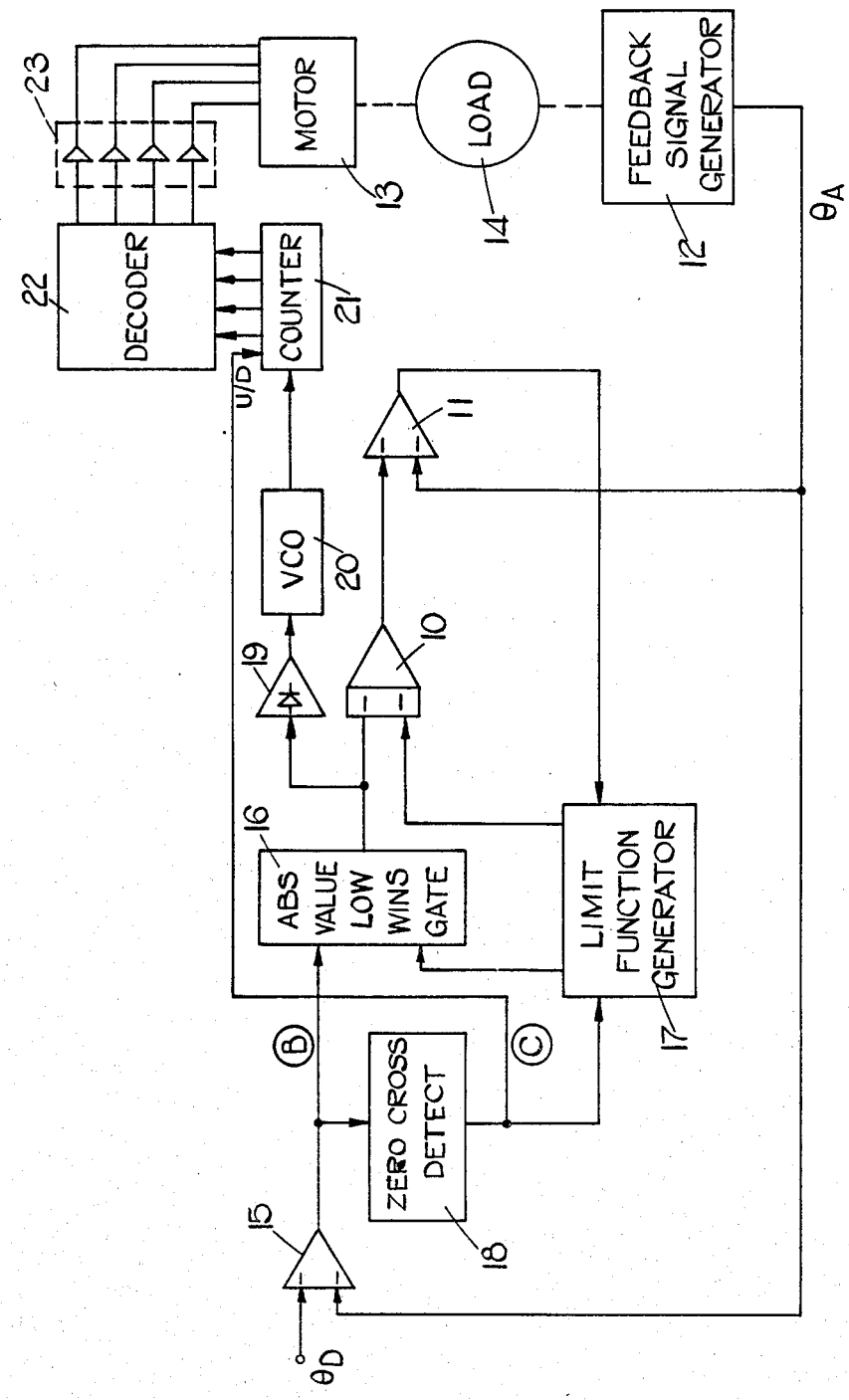
FIG. 1 is a block diagram of the stepper motor control circuit.

Referring firstly to FIG. 1 the control circuit includes an integrator 10 at the output of which there appears a signal corresponding to the time integral of the input of the integrator. A first error signal generating circuit 11 compares the integrator output with the signal from a transducer means in the form of a feedback signal generator 12. This signal is dependent either directly on the position of the shaft of the stepper motor 13 or else on some parameter of a load 14 moved by the motor 13 (if this parameter follows such movement without any significant lag). The circuit 11 provides a first error signal dependent on the difference between its inputs.

The signal $\theta A$ from the generator 12 is also applied to a second error signal generating circuit 15 which also receives a signal $\theta D$ representing the required position of the motor shaft 13 (or other parameter). The second error signal from the circuit 15 which represents the difference between the desired and actual values of the shaft position or other parameters, is applied, together with the first error signal to a selector means 16 consisting of an absolute value lowest wins gate, the output of which is applied to one input of the integrator 10.

The circuit also includes an integrator reset means 17 which applies a signal to the other input of the integrator 10. The means 17 receives an input from the circuit 11 and another input from a zero crossing detector 18 sensitive to the output of the circuit 15 and produces an output signal which is a non-linear function of the output of the circuit 11. The second error signal is applied to the gate 16 via the means 17.

The output of the gate 16 is also applied to an absolute value amplifier 19 the output of which controls a pulse generator in the form of a voltage controlled oscillator 20. The output of the oscillator 20 is applied to a stepper motor drive circuit including a counter 21 which is clocked up or down according to the output of the zero crossing detector 18 at the VCO frequency. The multi-bit output of the counter is applied to a decoder circuit 22 which is interfaced with the motor windings by an amplifier module 23. The counter 21, decoder 22 and amplifier module 23 are not described in detail since such arrangements are common in the art of stepper motor control.

Figure 2:
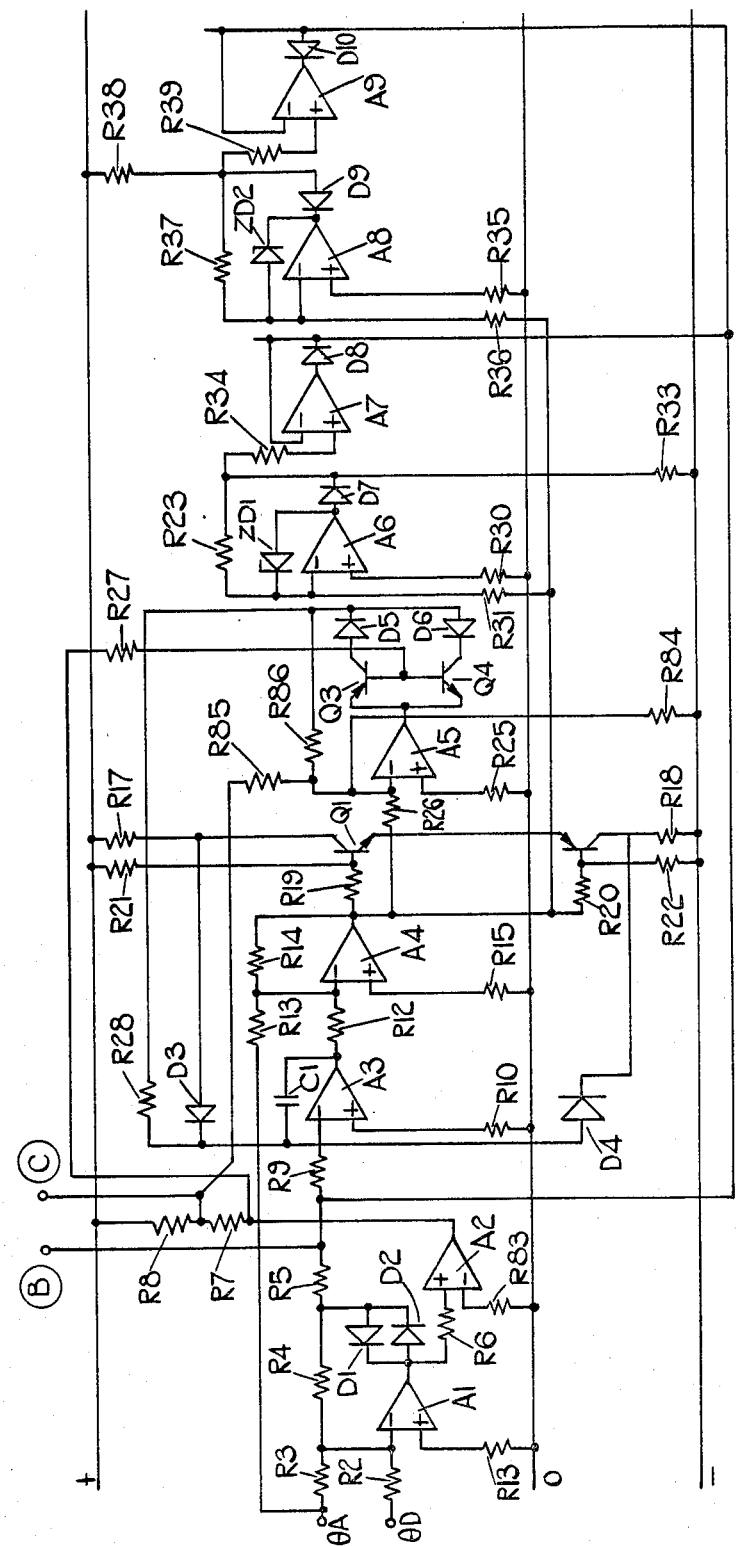
FIG. 2 is a circuit diagram of part of the circuit of FIG. 1.

Turning now to FIG. 2, the first error signal generating circuit 15 is represented by an operational amplifier A1 havings its non-inverting input connected by a resistor R1 to a ground rail, and its inverting input connected by two resistors R2, R3 to the outputs of a demand signal generator and the feedback signal generator 12, both of which may consist of buffered potentiometers connected to positive and negative reference signal sources (not shown). Two parallel connected reversed diodes D1, D2 are connected to the output of the amplifier A1 and feedback is provided by a resistor R4 connected to these diodes.

Figure 3:
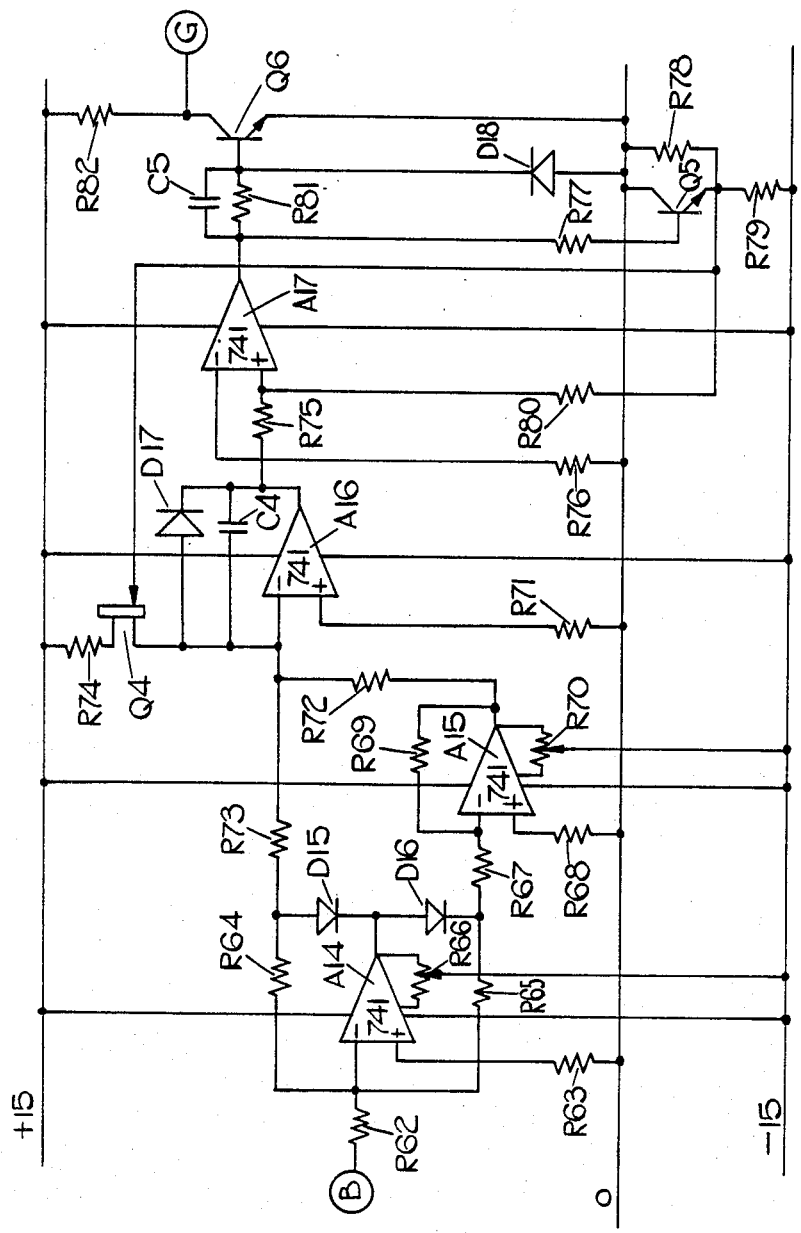
FIG. 3 is a circuit diagram of another part of the circuit.

A resistor R5 connects diodes D1, D2 to a terminal B (see FIG. 3).

The zero-crossing detector 18 consists of another operational amplifier A2 which has its non-inverting input connected by a resistor R6 to the output of amplifier A1 and its inverting input connected by a resistor R83 to the earth rail. The output of amplifier A2 is connected by two resistors R7, R8 in series to a positive supply rail, the junction of these resistors being connected by a terminal C to the UP/DOWN control terminal of the counter 21.

The integrator 10 is an operational amplifier A3 with its inverting input connected by a resistor R9 to terminal B and with a feedback capacitor C1 connected between its output and its inverting input. A resistor R10 is connected between the non-inverting input of amplifier A3 and the earth rail.

The second error signal generating circuit 11 is an operational amplifier A4 with its inverting input connected by resistors R12, R13 to the output amplifier A3 and to the $\theta A$ terminal respectively. A feedback resistor R14 connects the output of amplifier A4 to its inverting input and a resistor R15 connects the non-inverting input to the earth rail.

The limit circuit 17 includes two complementary type transistors Q1, Q2 which have their emitters connected to the earth rail and their collectors connected by resistors R17, R18 to the positive and negative supply rails respectively. Two resistors R19, R20 connect the bases of these transistors to the output of amplifier A4 and two bias resistors R21, R22 connect these bases to the + and − supply rails respectively. A diode D3 has its anode connected to the collector of npn transistor Q1 and its cathode connected to the inverting input of amplifier A3. Similarly a diode D4 has its cathode connected to the collector of pnp transistor Q2 and its anode connected to the inverting input of amplifier A3. The transistors Q1 and Q2 act as maximum value-clamps.

The limit function generator 17 also includes an operational amplifier A5 with its non-inverting input connected by a resistor R25 to the earth rail and its inverting input connected by a resistor R26 to the output of amplifier A4. The output of amplifier A5 is connected to two emitters of two complementary type transistors Q3, Q4, the bases of which are connected together and by a resistor R27 to the output of the amplifier A2. The pnp transistor Q3 has its collector connected to the anode of a diode D5 and the npn transistor Q4 has its collector connected to the cathode of a diode D6. The cathode of diode D5 and the anode of diode D6 are connected together and by a resistor R28 to the inverting input of amplifier A3. The inverting input of amplifier A5 is connected by a resistor R84 to the negative supply rail, by a resistor R85 to the terminal C, and by a resistor R86 to the cathode of diode D5. The amplifier A5 and transistors Q3, Q4 constitute minimum value-clamps.

The absolute value lowest wins gate 16 is constituted by four operational amplifiers A6, A7, A8 and A9. Amplifier A6 has its non-inverting input connected to the earth rail by a resistor R30 and its inverting input connected by a resistor R31 to the output of amplifier A4. A zener diode ZD1 has its cathode connected to the non-inverting input of amplifier A6 and its anode connected to the output thereof. A diode D7 has its anode connected to the output of amplifier A6. A resistor R32 is connected between the inverting input of amplifier A6 and the cathode of diode D7 which is also connected by a resistor R33 to the − supply rail. A resistor R34 connects the cathode of diode D7 to the non-inverting input of amplifier A7 the inverting input of which is connected to the cathode of a diode D8 which has its anode connected to the output of amplifier A7. The cathode of diode D8 is also connected to the terminal B.

The non-inverting input of amplifier A8 is connected by a resistor R35 to the earth rail and a resistor R36 connects the inverting input to the output of amplifier A4. A zener diode ZD2 has its anode connected to the inverting input of amplifier A8 and its cathode connected to the output thereof. A resistor R37 is connected between the inverting input of amplifier A8 and the anode of a diode D9 having its cathode connected to the output of amplifier A8. A resistor R38 connects the anode of diode D9 to the + supply rail and a resistor R39 connects this same anode to the non-inverting input of amplifier A9. The inverting input of amplifier A9 is connected to the anode of a diode D10 which has its cathode connected to the output of amplifier A9. The anode of diode D10 is connected to the terminal B.

Turning now to FIG. 3, the absolute value amplifier 19 of FIG. 1 includes two operational amplifiers A14 and A15. The amplifier A14 provides separate half wave rectification for negative and positive inputs by means of separate feedback loops and the amplifier A15 provides inversion of one of the output signals of the amplifier A14, the output of amplifier A15 and the other output of amplifier A14 being combined to provide the control voltage for the VCO.

The amplifier A14 has its inverting input terminal connected to the terminal B by a resistor R62 and its non-inverting input terminal connected to the earth rail by a resistor R63. The output terminal of the amplifier A14 is connected to the cathode of a diode D15, which has its anode connected to the inverting input terminal of the amplifier A14 by a resistor R64, and also to the anode of a diode D16, which has its cathode connected to the inverting input terminal of amplifier A14 by a resistor R65. In this case a potentiometer R66 is connected between the offset null terminals of the operational amplifier A14 with its slider connected to the − supply rail and is used to adjust the output of the absolute value amplifier to zero when the signal at terminal B is zero.

The cathode of the diode D16 is connected by a resistor R67 to the inverting input terminal of the amplifier A15 which has its non-inverting input terminal connected by a resistor R68 to the earth rail. A feedback resistor R69 is connected between the output and inverting input terminals of the amplifier A15. A potentiometer R70 connected between the offset null terminals of the amplifier A15 has its slider connected to the − supply rail and is used to adjust the deadband in the transfer characteristic of the absolute value amplifier occurring when the signal at terminal B is close to zero.

The VCO 20 also utilizes two operational amplifiers A16 and A17 respectively acting as a ramp generator and a Schmidt Trigger respectively. The amplifier A16 has its non-inverting input terminal connected to the earth rail by a resistor R71 and two resistors R72 and R73 connect the inverting input terminal of amplifier A16 to the output terminal of amplifier A15 and to the anode of the diode D15 respectively. Feedback is provided by a capacitor C4 and a diode D17 in parallel between the output and inverting input terminals of the amplifier A16. Also connected to the inverting input terminal of the amplifier A16 is the source of an n-channel field effect transistor Q4, the drain of which is connected by a resistor R74 to the + supply rail.

The output terminal of the amplifier A16 is connected by a resistor R75 to the non-inverting input terminal of the amplifier A17, which has its inverting input terminal connected to the earth rail by a resistor R76. The output terminal of the amplifier A17 is connected by a resistor R77 to the base of an npn transistor Q5 which has its collector connected to the earth rail and its emitter connected to the common point of two resistors R78, R79 connected in series between the earth rail and the − supply rail. The emitter of the transistor Q5 is connected to the gate of the field effect transistor Q4 and is also connected by a resistor R80 to the non-inverting input terminal of the amplifier A17.

When the signal at terminal B is zero, the only input to the amplifier A16 is that via the field effect transistor Q4. If the latter is turned on (i.e. if the output of the amplifier A17 is high so that transistor Q5 is turned on)

current will flow through the f.e.t. Q4 into the virtual earth point of amplifier A16 and out of this point via the capacitor C4 so that voltage at the output of the amplifier A16 falls to a level limited by the diode D17, which level is low enough to switch the amplifier A17 output low switching off transistor Q5 and the f.e.t. Q4 and applying d.c. positive feedback to the non-inverting input terminal of the amplifier A17. The VCO remains in this condition until the signal at terminal B changes from zero in which case a negative signal will be applied to the inverting input terminal of the amplifier A16 through one or other of the resistors R73, R72 (dependent on the polarity of the signal at terminal B). This will cause the signal at the output of the amplifier to rise at a rate proportional to the magnitude of the voltage at the terminal B, until the amplifier A17 switches, field effect transistor Q4 turns on again and the output voltage of amplifier A16 falls again until f.e.t. Q4 switches off. Thus the frequency of the output of amplifier A17 increases with increasing magnitude of the signal at terminal B.

The output terminal of the amplifier A17 is also connected by a resistor R81 and a capacitor C5 in parallel to the base of an npn transistor Q6 with its emitter connected to earth rail and its collector connected by a resistor R82 to the + supply rail and also connected to the terminal G (i.e. the CLOCK terminal of the counter). A diode D18 has its cathode connected to the base of the transistor Q6 and its anode connected to the earth rail.

In use, equilibrium exists in the complete control loop when the load 14 is so positioned that the output of the amplifier A1 is zero. In this case the input of the integrator amplifier A3 is zero so that its output is at a steady value.

If there is now a step-change in the $\theta D$ input signal, there will be a step change in the output of amplifier A1. Assuming the step change in $\theta D$ to be positive, the output of amplifier A1 will go negative. The output of amplifier A2 will thus go negative, causing the counter 21 to be appropriately clocked, but also causing the transistor Q3 to become conductive so that the output of amplifier A4 is clamped initially to a small positive value. At this stage this small positive value wins the absolute value lowest wins gate, i.e. this small positive value causes amplifier A9 to provide a source of current to be sunk by amplifier A1, so that the voltage at terminal B falls only to a small negative value, of magnitude equal to the small positive value. This positive value is chosen to correspond to a VCO frequency about half the maximum pull in frequency of the motor.

The minimum stepping rate which corresponds to the small negative value referred to, is determined by the resistors R84 and R85 (in practice R85 has half the resistance of R84). If the amplifier A2 output is at its full negative limit, the terminal C is at zero volts. Thus resistor R84 causes the output of amplifier A5 to go to a large positive value. This makes the output of amplifier A3 slew negatively (via transistor Q3, diode D5 and resistor R28) so that the output of amplifier A4 slews positively until the loop is balanced with the amplifier A4 output at the small positive value.

Following a negative step change in the position demand signal $\theta D$, the output of amplifier A2 goes positive, the current through resistor R27 switches on transistor Q4 and the output at terminal C is fully positive. Resistor R85 thus pulls the input to amplifier A5 positive causing its output to go very negative. Thus causes amplifier A3 output to slew positively and A4 output to slew negatively until A4 balances at small negative output.

Returning to the operation following a positive step change in demand, the output of amplifier A4 commences, as explained above at a small positive value, the motor starts running so that the feedback signal generator output $\theta A$ slews negatively. This causes the output of amplifier A4 to slew positively, overcoming the clamping. This causes the signal at terminal B to go negative via the absolute value lowest wins gate. The B signal slewing negatively would cause the output of amplifier A3 to slew positively, but $\theta A$ slews negatively faster than the output of amplifier A3 slews positively (integrator time constant > motor feedback signal generator time constant), so that positive feedback is provided and the output of amplifier A4 rises exponentially.

When the rate of rise of the stepping rate reaches a certain value (set by capacitors - now shown - on the inputs of amplifiers A7 and A9) the rate of rise of the B signal would asymptotically approach a set level slightly greater than the set maximum stepping rate. When the output of amplifier A4 reaches a set level, however, (e.g. 4.5 V) Q2 (which is normally on) turns off and the velocity is thus limited by Q2.

When the load is approaching the desired position the output of amplifier A1 will rise from its large negative value until it becomes sufficiently near zero to "win" the absolute value lowest wins gate and bring the integrator input back to zero.

A similar sequence occurs following a negative step-change in the demand signal $\theta D$.

If the load on the motor is such that pull-out occurs, the slew rate of $\theta A$ will fall. Since the amplifier A3 is still slewing, the integrator A3 output slew rate is now the greater so that the output of amplifier A4 is reduced and falls back to the pull-in voltage. Then the motor re-synchronises to restore the positive feedback loop.

The circuit described above, thus automatically controls the stepper motor to give optimum performance during acceleration and steady running and also automatically detects and corrects drop out which can occur when the motor is heavily loaded.

I claim:

1. A stepper motor control circuit comprising an electrical integrator generating an output signal dependent on the time integral of its input signal, a first error signal generating means connected to said integrator output and to the output of a transducer means sensitive to the value of a parameter variable by movement of the stepper motor shaft and producing a first error signal dependent on the difference between the integrator and transducer means outputs, a second error signal generating means for comparing the actual value of said parameter (as represented by the transducer means output) with a desired value thereof and producing a second error signal dependent on the difference between the desired and actual values of said parameter, selector means connected to said first and second error signal generating means and to said integrator and selecting the one of said first and second error signals having the lesser absolute value for application to the integrator input, integrator reset means connected to the output of the first error signal generating means and to the input of the integrator and applying to the integrator an additional signal varying non-linearly with the output of the first error signal generating means whereby the rate of change of the output of the integrator is limited in accordance with the value of the first error signal, pulse generator means connected to the output of said selector means and producing an output of frequency determined by the output of said selector means and a stepper motor drive circuit connected to the pulse generator means and providing driving pulses to the stepper motor.

* * * * *